United States Patent [19]

Rechlicz

[11] 4,110,153
[45] Aug. 29, 1978

[54] METHOD OF FORMING A MICROPOROUS DIAPHRAGM

[75] Inventor: Thomas A. Rechlicz, Corpus Christi, Tex.

[73] Assignee: PPG Industries, Inc., Pittsburgh, Pa.

[21] Appl. No.: 831,573

[22] Filed: Sep. 8, 1977

[51] Int. Cl.² .................. B44C 1/22; C03C 15/00; C03C 25/06
[52] U.S. Cl. ............................ 156/633; 156/77; 156/155; 156/644; 156/655; 264/49
[58] Field of Search .............. 260/2.5 M; 65/31; 204/98, 296; 264/41, 48, 49, 344; 427/243–245; 28/76 R; 428/131, 137, 178, 421, 422; 156/630, 633, 644, 654, 655, 657, 663, 77, 155

[56] References Cited

U.S. PATENT DOCUMENTS

| | | | |
|---|---|---|---|
| 2,772,995 | 12/1956 | Wilson | 156/155 X |
| 3,473,985 | 10/1969 | Erickson | 156/630 |
| 3,694,281 | 9/1972 | Leduc | 156/77 |
| 3,890,417 | 6/1975 | Vallance | 156/77 X |
| 4,034,751 | 7/1977 | Hung | 156/77 X |

Primary Examiner—William A. Powell
Attorney, Agent, or Firm—Richard M. Goldman

[57] ABSTRACT

Disclosed is a method of forming an unsintered, nonwoven, wettable, microporous diaphragm of a fluorocarbon polymer. The diaphragm is prepared by maintaining a nonwoven, fibrous mat of a leachable material in contact with the external surfaces of the fluorocarbon polymer film while hot pressing the halocarbon polymer film above its flow temperature and below its thermal decomposition temperature, and thereafter leaching the fibrous mat out of the halocarbon film. Additionally, monomers having acidic or basic groups may be grafted to the pore walls. Also disclosed is a method of rendering a hydrophobic fluorocarbon polymer film wettable by compressing the film between a pair of nonwoven mats of a leachable fibrous material while maintaining the film above the flow temperature thereof but below its decomposition temperature and then leaching the fibrous material out of the film.

9 Claims, 1 Drawing Figure

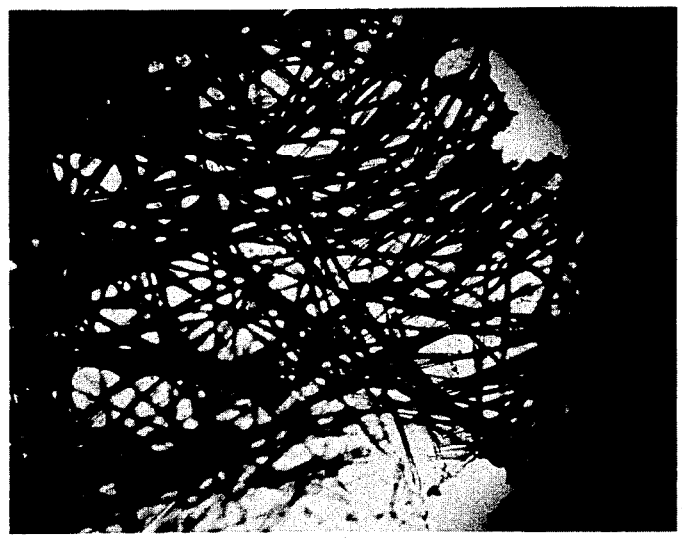

METHOD OF FORMING A MICROPOROUS DIAPHRAGM

DESCRIPTION OF THE INVENTION

Chlorine, alkali metal hydroxide, and hydrogen can be produced in an electrolytic cell, for example, a diaphragm cell. In a diaphragm cell, the electrolyte chamber is divided into an anolyte compartment and a catholyte compartment by a diaphragm. An aqueous solution of an alkali metal chloride, i.e., brine, is fed to the anolyte compartment. In the anolyte compartment the chloride ion of the disassociated alkali metal chloride forms chlorine at the anode according to the reaction:

$$2Cl^- \rightarrow Cl_2 + 2e^-.$$

The anolyte liquor, including alkali metal ion, hydroxyl ion, and chloride ion, then permeate through the permeable diaphragm to the catholyte compartment. In the catholyte compartment, alkali metal hydroxide and gaseous hydrogen are liberated at the cathode according to the reaction:

$$2H^+ + 2e^- \rightarrow H_2.$$

A catholyte liquid containing alkali metal chloride and alkali metal hydroxide is then recovered from the catholyte compartment.

The diaphragm also serves to maintain a difference in pH between the two compartments. Typically, the electrolyte in the anolyte compartment will have a pH of from about 2 to about 5 while the electrolyte in the catholyte compartment will be in excess of 1 normal in alkali metal hydroxide. The diaphragm in a typical electrolytic cell serves to maintain this difference in pH while permitting the flow of electrolyte therethrough.

Diaphragms of the prior art, as distinguished from permionic membranes which provide a catholyte consisting essentially of the alkali metal hydroxide and water, have been formed of asbestos. The synthetic diaphragms, for example, formed of polymer films, have not achieved acceptance in the art. It is believed that this is due to the short lives of nonfluorinated polymers and the hydrophobicity of fluorinated polymers.

Attempts to improve the hydrophilic properties of the membranes have involved thinner membranes and cation selective ion exchange groups. Thin membranes of perfluorocarbon sulfonyl polymers reinforced with inert woven fabrics and having pores obtained by removal of decomposable woven fabrics are known. See, e.g., U.S. Pat. No. 4,021,327 to Grot for *Reinforced Cation Permeable Separator*. However, such membranes require a sulfonated polymer and the use of woven fabrics of at least two different kinds of fibers for their formation.

It has now been found that a particularly satisfactory unsintered, nonwoven, wettable, microporous polyfluorocarbon diaphragm can be prepared by maintaining a nonwoven fibrous mat of a leachable material in contact with the external surfaces of a polyfluorocarbon film while hot pressing the polyfluorocarbon film above the flow temperature thereof but below the thermal decomposition temperature thereof. Thereafter, the nonwoven fibrous mat is leached out of the heated and compressed film. It has also been found that the hydrophobic fluorocarbon polymer treated thereby is reduced in hydrophobic character and becomes wettable. It has also been found that the microporous polyfluorocarbon diaphragm, having an interconnected network of substantially uniform pores, can be reacted within the pores to enhance its wettability, e.g., by grafting of acid groups onto the interior walls of the pores.

DETAILED DESCRIPTION OF THE INVENTION

By a microporous diaphragm is meant a diaphragm having pores with a mean pore diameter of from about 5 to about 20 microns and preferably from about 7 to about 17 microns. Additionally, the pores should be in the form of a network of interconnected substantially uniform but tortuous pores. Preferably, the diaphragm itself should have a thickness of about 3 mils to about 25 mils with a thickness of about 5 mils to about 15 mils being particularly preferred. In this way, an effective pore length, that is, the length that an ion must traverse from one side of the diaphragm to the other is typically on the order of from about 5 mils to about 150 mils.

The preferred diaphragms herein contemplated are those that are nonwoven. That is, they are not woven to a pattern but rather obtain their porosity by the action of the leachable nonwoven fabrous material during the high temperature hot press stage and subsequent removal thereof. Such diaphragms are substantially free of reinforcing fibers and residual fibers.

By a wettable material is meant a material having a critical surface tension, $\gamma_c$, of in excess of 15 dynes per centimeter and preferably in excess of about 17 dynes per centimeter.

The preferred microporous diaphragm is one that is unsintered. That is, one that is prepared by melting a polymeric film or sheet. By an unsintered microporous diaghragm is meant a microporous diaphragm as characterized by the substantial absence of combustion products of the precursor polymer. The fluorocarbon polymers useful in the practice of this invention are those containing hydrogen atoms or chlorine atoms or side chains such as perfluoro side chains or perfluoro alkoxy side chains.

The fluorocarbon polymers herein contemplated are those having the repeating units:

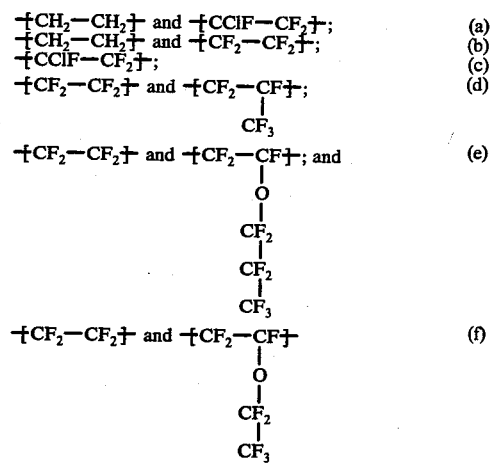

as well as terpolymers of perfluoroethylene with (1) hexafluoropropylene and (2) either perfluoro(ethyl vinyl ether) or perfluoro(n-propyl vinyl ether). Particularly preferred are copolymers of tetrafluoroethylene and hexafluoropropylene sold under the tradename of "FEP" fluorinated ethylene propylene and having the repeating units:

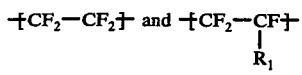

where $R_1$ is chosen from the group consisting of $CF_3$ and perfluoroalkoxy as defined below. Such fluorocarbons include polymers having the repeating units:

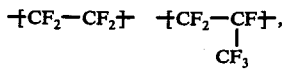

copolymers of tetrafluoroethylene and perfluoroalkoxys having a vinyl group as exemplified by perfluoro(alkyl vinyl ether), e.g., perfluoro(ethl vinyl ether) and perfluoro(n-propyl vinyl ether) sold under the tradename "PFA" perfluoroalkoxy and having the repeating units:

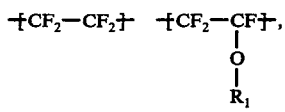

where $R_1$ is $-CF_2-CF_3$ or $-CF_2-CF_3$ and mixtures thereof, and terpolymers of perfluoroethylene, hexafluoropropylene, and perfluoro(alkyl vinyl ethers).

The copolymer of tetrafluoroethylene and hexafluoropropylene containing equimolar amounts of tetrafluoroethylene and hexafluoropropylene has a melting point of from about 250° to about 285° C. The copolymer of tetrafluoroethylene and perfluoro(propyl vinyl ether) containing about 98.5 mole percent tetrafluoroethylene and 1.5 mole percent perfluoro(propyl vinyl ether) has a melting point of from about 305° to 310° C. and an ASTM (American Society for Testing Materials) Method D2116 melt flow number of about 9 to 12 grams per 10 minutes. Particularly preferred are those fluoropolymers and chlorofluoropolymers having a melt flow number of from about 1 to about 20 grams per 10 minutes. Melt flow numbers below about 1 gram per 10 minutes require a high pressure which may result in compressing the fibers without producing a satisfactory pore structure. Melt flow numbers above about 20 grams per 10 minutes may result in complete encapsulation of the fibers by the polymer film, making it difficult to leach out the fiber.

According to the method of this invention, a nonwoven fibrous mat of a leachable material is maintained in contact with the external surfaces of the film. By a nonwoven material is meant a material that, for example, is prepared by deposition on a filtration media, such as by dispersing fibers in the liquid medium and drawing the liquid medium containing the fibers through a filter media.

Preferably, the fibers of the nonwoven fibrous mat of the leachable material have a fiber diameter on the order of the size of the desired pore diameters, for example, for about 5 to about 20 microns and preferably from about 7 to about 17 microns. The fibers should have a fiber length of from about 2 to about 50 millimeters and preferably from about 10 to about 30 millimeters although either longer or shorter fibers may be used without deleterious effects.

The material itself should be leachable, for example, leachable out of the fluorocarbon polymer on the action of an acid such as hydrochloric acid, sulfuric acid, phosphoric acid, hydrofluoric acid, chlorosulfonic acid, or on the action of a base such as sodium hydroxide or ammonium hydroxide.

According to one exemplification of this invention, the nonwoven fibrous mat of a leachable material may be prepared by dispersing the leachable material, for example, an aramide or rayon or cotton in a suitable solvent or solution and thereafter drawing the liqiud composition through a filter media to deposit the aramide fibers on the filter.

The loading of fibers in the fibrous mat is generally from about 25 to about 200 grams of fiber per square yard of fibrous mat on either side of a single 5 mil thick fluorocarbon film. Greater amounts may result in an unacceptably high degree of porosity unless the diaphragm prepared thereby is used in combination with a diaphragm of lower porosity. Lesser amounts of fiber, i.e., less than 25 grams per square yard, may result in a diaphragm where the pores do not extend the full way through the diaphragm.

Particularly satisfactory fibrous materials include fiber glass, viscose rayon, cotton, and aramides.

The nonwoven fibrous mat of a leachable material is maintained in contact with the external surfaces of the film of the fluorocarbon polymer while hot pressing the fluorocarbon polymer film to a temperature above its flow temperature but below its thermal decomposition temperature.

A single film can be interposed between a pair of fibrous mats or, according to a preferred exemplification, fibrous mats may be interleaved between fluorocarbon films in order to build up a microporous diaphragm of greater thickness. In this way, a film of about 5 to 25 mils in thickness can be prepared by interposing a single film between a pair of fibrous mats and a film can be prepared in excess of 5 mils in thickness by alternating fibrous mats between individual fluorocarbon films.

Generally, for the copolymer of tetrafluoroethylene and hexafluoropropylene, this is a temperature of from about 280° C. to about 370° C. while for copolymer of tetrafluoroethylene and perfluoro(propyl vinyl ether) this is a temperature of from about 310° C. to about 375° C. The pressure is typically on the order of from about 10 to about 1,000 pounds per square inch. The material is maintained at this temperature and pressure for from about one hour to about four hours in order to obtain complete diffusion of the flowing polymer through the nonwoven fibrous mat of a leachable material. Thereafter, the temperature may be reduced and the pressure diminished.

The leachable material may then be leached out by the action of strong acid, for example, hydrochloric acid, chlorosulfonic acid, or sulfuric acid, at a temperature of from about 80° to about 150° C. and a leaching time of from about two to about eight hours.

The resulting microporous product has the pore diameter corresponding to the diameter of the fibers and the pore geometry corresponding roughly to the tortuosity of the fiber pattern.

The FIGURE shows a microporous diaphragm prepared by pressing alternate layers of nonwoven fibrous rayon mat and an ethylenechlorotrifluoroethylene polymer together at elevated temperature. The rayon was then dissolved with sulfuric acid leaving a microporous diaphragm. Thin slices of the diaphragm were dipped in black ink, washed with water, and examined under an optical microscope at approximately eighty fold magnification. The resulting diaphragm has the interconnected network pattern of pores shown eighty fold magnification optical view of a sliced section in the FIGURE.

According to one exemplification of this invention, the fibrous nonwoven mat is prepared by adding from about 0.5 to about 2 grams per liter of aramide fibers having a diameter of about 15 microns and a fiber length of about ¼ inch to a solution of equal amounts of water and ethylene glycol stirred with a magnetic stirrer until all the fiber strands are separated. The slurry is then poured into a large funnel filter and the ethylene glycol-water is filtered through. The fiber pad is then removed from the funnel and separated from the filter paper.

Two fiber pads prepared as described above having a loading of 100 grams per square yard is then placed on each side of a 5 to 15 mil thick sheet of a copolymer of tetrafluoroethylene and hexafluoropropylene. The resulting structure is then heated to a temperature of from about 300° C. to about 330° C. for a time of from about one hour at an imposed pressure of about 250 pounds per square inch. Thereafter, the laminate is removed from the high pressure, high temperature hydraulic press and leached with chlorosulfonic acid at a temperature of about 125° C. for about four hours. The resulting microporous diaphragm is then inserted as a diaphragm between an anode and a cathode of a laboratory electrolytic cell and electrolyte is fed into the anolyte compartment as an electrical current passes from the anode of the cell to the cathode of the cell. Chlorine may be evolved at the anode and hydrogen at the cathode.

According to a still further exemplification of this invention, the microporous fluorocarbon polymer diaphragm can be further increased in hydrophilic character for bonding acid groups or basic groups to the diaphragm, especially to the interior walls of the pores. For example, when the fluorocarbn polymer has $+CH_2-CH_2+$ and $+CClF$ and $CF_2+$ groups either a hydrogen or a chlorine can be replaced by an acid or basic group. Likewise, when the fluorocarbon polymer has $+CH_2-CH_2+$ and $+CF_2-CF_2+$ groups, a hydrogen can be replaced by an acid or basic group. Similarly, when the fluorocarbon polymer has $+CFCl-CF_2+$ groups, the chlorine can be replaced by an acid or basic group. Alternatively, when the fluorocarbon polymer has either $+CF_2-CF_2+$ and $+CF_2-CF(OCF_2CF_2CF_3)+$ groups or $+CF_2-CF_2+$ and $+CF_2-CF(CF_3)+$ groups or $+CF_2-CF_2+$ and $+CF_2-CF(OCF_2CF_3)+$ groups, a monomer having active groups, i.e., acid groups or basic groups, may be grafted thereto. In this way, a microporous diaphragm is prepared comprising a poly(fluorocarbon) with pendant active groups, i.e., pendant acid groups or pendant base groups. Typical monomers having vinyl unsaturation and active groups of the general type

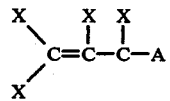

where A is an active acidic or basic group and the X's are various monovalent groups as H, halogens and mixtures thereof, e.g., acrylic acid, methacrylic acid, and acrylamide.

The following examples are illustrative.

EXAMPLE I

A fluorinated ethylene-propylene microporous diaphragm was prepared by hot pressing a DuPont "FEP" fluorinated ethylene-propylene film between a pair of DuPont NOMEX ® aramid nonwoven fibrous mats and thereafter leaching out the fibers. The resulting microporous diaphragm was installed in a laboratory diaphragm cell and electrolysis of sodium chloride brine was carried out.

DuPont NOMEX ® brand aramid fibers were added to a solution of ethylene glycol and water. The fibers were ¼ inch long by 15 microns in diameter. The resulting liquid was agitated until a uniform slurry was obtained. The slurry was then divided into two portions and each portion was filtered through a Buchner filter, depositing a uniform bed of nonwoven, fibrous aramid. Filtration was continued until a bed having a fiber loading of 75 grams per square yard was obtained.

The two fibrous beds were then placed on either side of a 5 mil thick fluorocarbon film of DuPont "FEP" brand fluorinated ethylene-propylene thereby forming a laminate of the poly(fluorocarbon) between two mats of nonwoven, fibrous aramid.

The resulting laminate was then heated to between 325° to 350° C. for 120 minutes at a pressure of 250 pounds per square inch, which was gradually increased to 500 pounds per square inch, gauge. The laminate was allowed to cool and was then placed in chlorosulfonic acid. The aramid fibers were leached out, leaving behind a microporous fluorinated ethylenepropylene film having an interconnected network of pores.

The microporous film was installed as a microporous diaphragm in a laboratory electrolytic cell between the expanded iron mesh cathode and the anode. The anode was expanded titanium mesh having a surface of ruthenium dioxide and titanium dioxide. Electrolysis was carried out and chlorine was seen to be evolved. After 125 days of electrolysis at a current density of 190 amperes per square foot, the average cell voltage was 4.40 volts, the average anode current efficiency was 81.6 percent, the average cathode current efficiency was 79.4 percent, and the cell liquor contained 9.6 weight percent sodium hydroxide.

EXAMPLE II

A perfluoroalkoxy microporous diaphragm was prepared by hot pressing a DuPont "PFA" poly(perfluoroethylene-perfluoro-n-propyl vinyl ether) film between a pair of DuPont NOMEX ® aramid nonwoven, fibrous mats and thereafter leaching out the fibers. The resulting microporous diaphragm was installed in a laboratory diaphragm cell and electrolysis of sodium chloride brine was carried out.

DuPont NOMEX ® brand aramid fibers were added to a solution of ethylene glycol and water. The fibers were ¼ inch long by 15 microns in diameter. The resulting liquid was agitated until a uniform slurry was obtained. The slurry was then divided into two portions and each portion was filtered through a Buchner filter, depositing a uniform bed of nonwoven, fibrous aramid. Filtration was continued until a bed having a fiber loading of 75 grams per square yard was obtained.

The two fibrous beds were then placed on either side of a 5 mil thick fluorocarbon film of DuPont "PFA" brand poly(perfluoroethylene-perfluoro-n-propyl vinyl ether) thereby forming a laminate of the poly(fluorocarbon) between two mats of nonwoven, fibrous aramid.

The resulting laminate was then heated to 340° C. for two hours at a pressure of 50 pounds per square inch, gauge. The laminate was allowed to cool and was then placed in chlorosulfonic acid and subsequently neutralized with sodium hypochlorite. The aramid fibers were leached out leaving behind a microporous perfluoroalkoxy film having an interconnected network of pores.

The microporous film was installed as a microporous diaphragm in a laboratory electrolytic cell between the expanded iron mesh cathode and the anode. The anode was expanded titanium mesh having a surface of ruthenium dioxide and titanium dioxide. Electrolysis was carried out and chlorine was seen to be evolved.

EXAMPLE III

A perfluoroalkoxy microporous diaphragm was prepared by hot pressing a DuPont "PFA" poly(perfluoroethylene-perfluoro-n-propyl vinyl ether) film between a pair of DuPont NOMEX ® aramid nonwoven, fibrous mats and thereafter leaching out the fibers. The resulting microporous diaphragm was installed in a laboratory diaphragm cell and electrolysis of sodium chloride brine was carried out.

DuPont NOMEX ® brand aramid fibers were added to a solution of ethylene glycol and water. The fibers were ¼ inch long by 15 microns in diameter. The resulting liquid was agitated until a uniform slurry was obtained. The slurry was then divided into two portions and each portion filtered through a Buchner filter, depositing a uniform bed of nonwoven, fibrous aramid. Filtration was continued until a bed having a fiber loading of 100 grams per square yard was obtained.

The two fibrous beds were then placed on either side of a 5 mil thick fluorocarbon film of DuPont "PFA" brand poly(perfluoroethylene-perfluoro-n-propyl vinyl ether) thereby forming a laminate of the poly(fluorocarbon) between two mats of nonwoven, fibrous aramid.

The resulting laminate was then heated to between 330° to 340° C. for 60 minutes at a pressure of 50 pounds per square inch, gauge. The laminate was allowed to cool and was then placed in chlorosulfonic acid. The aramid fibers were leached out, leaving behind a microporous perfluoroalkoxy film having an interconnected network of pores.

The microporous film was installed as a microporous diaphragm in a laboratory electrolytic cell between the expanded iron mesh cathode and the anode. The anode was expanded titanium mesh hving a surface of ruthenium dioxide and titanium dioxide. Electrolysis was carried out and chlorine was seen to be evolved. After 144 days of electrolysis at a current density of 190 amperes per square foot, the average cell voltage was 3.77 volts, the average anode current efficiency was 80.4 percent, the average cathode current efficiency was 81.5 percent, and an instantaneous voltage of 3.6 volts after 144 days of electrolysis with 88.7 percent cathode efficiency. The cell liquor contained 9.6 weight percent sodium hydroxide.

EXAMPLE IV

A fluorinated ethylene-propylene microporous diaphragm was prepared by hot pressing a DuPont "FEP" brand fluorinated ethylenepropylene film between a DuPont NOMEX ® aramid nonwoven, fibrous mat and a fiber glass nonwoven, fibrous mat and thereafter leaching out the fibers. The resulting microporous diaphragm was installed in a laboratory diaphragm cell and electrolysis of sodium chloride brine was carried out.

DuPont NOMEX ® brand aramid fibers were added to a solution of ethylene glycol and water. The fibers were ¼ inch long by 15 microns in diameter. The resulting liquid was agitated until a uniform slurry was obtained. The slurry was then divided into two portions and each portion was filtered through a Buchner filter, depositing a uniform bed of nonwoven, fibrous aramid. Filtration was continued until a bed having a fiber loading of 100 grams per square yard was obtained.

A second slurry was prepared containing 20 weight percent of 2 micron diameter fiber glass particles and 80 weight percent of 10 micron diameter 0.025 to 0.25 inch length fiber glass fibers, basis total solids. The slurry was filtered to provide a filter cake having a solids loading of 75 grams per square yard.

The two NOMEX ® aramid fibrous beds were then placed on one side of the 5 mil thick fluorocarbon film of DuPont "FEP" brand fluorinated ethylene-propylene, and the fiber glass mat was placed on the opposite side thereby forming a laminate of the poly(fluorocarbon) between two mats of nonwoven, fibrous material.

The resulting laminate was then heated to 330° C. for 120 minutes at a pressure of 250 pounds per square inch, gauge, and increased to 500 pounds per square inch, gauge. The laminate was allowed to cool and was then placed in chlorosulfonic acid for 24 hours and aqueous hydrofluoric acid for 48 hours. The fibers were leached out, leaving behind a microporous fluorinated ethylene-propylene film having an interconnected network of pores.

The microporous film was installed as a microporous diaphragm in a laboratory electrolytic cell between the expanded iron mesh cathode and the anode. The anode was expanded titanium mesh having a surface of ruthenium dioxide and titanium dioxide. Electrolysis was carried out and chlorine was seen to be evolved. After 112 days of electrolysis at a current density of 190 amperes per square foot, the average cell voltage was 4.20 volts, the average anode current efficiency was 67.9 percent, and the average cathode current efficiency was 70.4 percent.

EXAMPLE V

A fluorinated ethylene-propylene microporous diaphragm was prepared by hot pressing a DuPont "FEP" brand fluorinated ethylenepropylene film between a DuPont NOMEX ® aramid nonwoven, fibrous mat and a nonwoven, fiber, fiber glass mat and thereafter leaching out the fibers. The resulting microporous diaphragm was installed in a laboratory diaphragm cell and electrolysis of sodium chloride brine was carried out.

DuPont NOMEX ® brand aramid fibers were added to a solution of ethylene glycol and water. The fibers were ¼ inch long by 15 microns in diameter. The resulting liquid was agitated until a uniform slurry was obtained. The slurry was then divided into two portions and each portion was filtered through a Buchner filter, depositing a uniform bed of nonwoven, fibrous aramid. Filtration was continued until a bed having a fiber loading of 100 grams per square yard was obtained.

A second slurry was prepared containing 20 weight percent of 2 micron diameter fiber glass particles and 80 weight percent of 10 micron diameter 0.025 to 0.25 inch length fiber glass fibers, basis total solids. The slurry was filtered to provide a filter cake having a solids loading of 75 grams per square yard.

The two NOMEX ® aramid fibrous beds were then placed on one side of the 5 mil thick fluorocarbon film of DuPont "FEP" brand fluorinated ethylene-propylene, and the fiber glass was placed on the opposite side thereby forming a laminate of the poly(fluorocarbon) between two mats of nonwoven, fibrous material.

The resulting laminate was then heated to 330° C. for 120 minutes at a pressure of 250 pounds per square inch, gauge, which was increased to 500 pounds per square inch, gauge. The laminate was allowed to cool and was then placed in chlorosulfonic acid for 24 hours and aqueous hydrofluoric acid for 48 hours. The fibers were leached out, leaving behind a microporous fluorinated ethylene-propylene film having an interconnected network of pores.

The microporous film was installed as a microporous diaphragm in a laboratory electrolytic cell between the expanded iron mesh cathode and the anode. The anode was expanded titanium mesh having a surface of ruthenium dioxide and titanium dioxide. Electrolysis was carried out and chlorine was seen to be evolved. After 110 days of electrolysis, the average cell voltage was 5.31 volts, the average anode current efficiency was 75.2 percent, and the average cathode current efficiency was 78.1 percent.

While the invention has been described with reference to specific exemplifications and embodiments thereof, it is not intended to be so limited except as described in the claims appended hereto.

I claim:

1. A method of forming an unsintered, wettable, microporous polyfluorocarbon diaphragm comprising:
   maintaining a nonwoven mat of a leachable fibrous material in contact with the external surfaces of a polyfluorocarbon film while hot pressing the polyfluorocarbon film above the flow temperature thereof but below the thermal decomposition temperature thereof; and
   thereafter leaching out the fibrous material.

2. The method of claim 1 wherein the fluorocarbon has the repeating units:

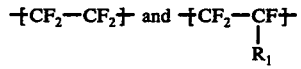

where $R_1$ is chosen from the group consisting of $-CF_3$, $-O-CF_2-CF_3$, and $-O-CF_2-CF_2-CF_3$.

3. The method of claim 2 wherein the fluorocarbon is a copolymer of tetrafluoroethylene and a perfluoro(alkyl vinyl ether).

4. A method of rendering a hydrophobic fluorocarbon polymer film wettable comprising:
   compressing the film between a pair of nonwoven mats of a leachable, fibrous material; and
   thereafter leaching out the fibrous material.

5. The method of claim 4 wherein the fluorocarbon has the repeating units:

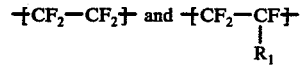

where $R_1$ is chosen from the group consisting of $-CF_3$, $-O-CF_2-CF_3$, and $-O-CF_2-CF_2-CF_3$.

6. The method of claim 5 wherein the fluorocarbon is a copolymer of tetrafluoroethylene and a perfluoro(alkyl vinyl ether)

7. A method of preparing a microporous diaphragm comprising a poly(fluorocarbon) with pendant active groups which method comprises:
   maintaining a nonwoven mat of a leachable fibrous material in contact with the external surfaces of a poly(fluorocarbon) film while hot pressing the poly(fluorocarbon) film above the flow temperature thereof but below the thermal decomposition temperature thereof;
   leaching the fibrous material out of the poly(fluorocarbon) film whereby to provide a network of pores within the poly(fluorocarbon) film; and
   grafting a monomer having vinyl unsaturation and active groups on the walls of the pores.

8. The method of claim 7 wherein the fluorocarbon has the repeating units:

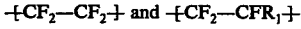

where $R_1$ is chosen from the group consisting of $-CF_3$, $-O-CF_2-CF_3$, and $-O-CF_2-CF_2-CF_3$.

9. The method of claim 7 wherein the monomer has the formula

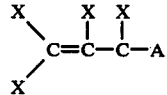

where A is chosen from the group consisting of acidic groups and basic groups and X is chosen from the group consisting of the halogens and hydrogen.

* * * * *